(12) United States Patent
Achleitner et al.

(10) Patent No.: US 9,729,078 B2
(45) Date of Patent: Aug. 8, 2017

(54) AC/DC VOLTAGE TRANSFORMER AND METHOD OF OPERATION THEREFOR

(71) Applicant: Fronius International GmbH, Pettenbach (AT)

(72) Inventors: Guenter Achleitner, Sattledt (AT); Gernot Trauner, Buchkirchen (AT); Andreas Pamer, Wallern (AT)

(73) Assignee: Fronius International GmbH, Pettenbach (AT)

( * ) Notice: Subject to any disclaimer, the term of this patent is extended or adjusted under 35 U.S.C. 154(b) by 206 days.

(21) Appl. No.: 14/376,685

(22) PCT Filed: Feb. 5, 2013

(86) PCT No.: PCT/AT2013/050029
§ 371 (c)(1),
(2) Date: Oct. 15, 2014

(87) PCT Pub. No.: WO2013/116885
PCT Pub. Date: Aug. 15, 2013

(65) Prior Publication Data
US 2015/0146464 A1    May 28, 2015

(30) Foreign Application Priority Data
Feb. 6, 2012   (AT) .................. A 156/2012

(51) Int. Cl.
*H02M 7/10* (2006.01)
*H02M 1/14* (2006.01)
(Continued)

(52) U.S. Cl.
CPC ............... *H02M 7/10* (2013.01); *H02M 1/14* (2013.01); *H02M 7/217* (2013.01); *H02M 7/219* (2013.01); *H02M 7/487* (2013.01)

(58) Field of Classification Search
CPC .......... H02M 1/14; H02M 7/10; H02M 7/217; H02M 7/219; H02M 7/487
See application file for complete search history.

(56) References Cited

U.S. PATENT DOCUMENTS 4,881,159 A * 11/1989 Holtz .................... H02M 7/487
363/137
5,657,742 A    8/1997 Greenall
(Continued)

FOREIGN PATENT DOCUMENTS

EP    0 642 212 A1    3/1995
EP    1 325 550 B1    7/2003
(Continued)

OTHER PUBLICATIONS

International Search Report of PCT/AT2013/050029, mailed May 13, 2014.
(Continued)

*Primary Examiner* — Fred E Finch, III
*Assistant Examiner* — Demetries A Gibson
(74) *Attorney, Agent, or Firm* — Collard & Roe, P.C.

(57) ABSTRACT

A method for actuating an AC/DC voltage converter is specified, which has a DC voltage output between which at least one series circuit of at least two capacitors and at least one series circuit of n switching elements-is arranged, where $n \geq 4$. A connecting point of the switching elements is connected to a connection of an AC voltage input between $n/2$ switching elements. Two diodes are connected in an antiparallel arrangement to the two switching elements lying closest to the connecting point. In addition, a connecting point of the capacitors is connected to a connecting point of the diodes. An output voltage at the DC voltage output and a potential of the connecting point of the capacitors or diodes are provided as controlled variables, an input current at the AC voltage input is provided as a manipulated variable and (Continued)

the switching elements are provided as an actuating element of a control loop. In addition, a controller for implementing the method and an AC/DC voltage converter containing such a controller are specified.

11 Claims, 11 Drawing Sheets

(51) Int. Cl.
*H02M 7/217* (2006.01)
*H02M 7/219* (2006.01)
*H02M 7/487* (2007.01)

(56) References Cited

U.S. PATENT DOCUMENTS

| | | | | |
|---|---|---|---|---|
| 5,684,688 | A * | 11/1997 | Rouaud | H02M 1/34 363/132 |
| 5,953,222 | A * | 9/1999 | Mizutani | H02M 7/003 363/132 |
| 6,226,192 | B1 * | 5/2001 | Yamanaka | H02M 1/34 363/132 |
| 6,353,547 | B1 * | 3/2002 | Jang | H02M 7/487 363/132 |
| 6,392,907 | B1 * | 5/2002 | Ichikawa | H02M 7/487 363/132 |
| 6,480,403 | B1 | 11/2002 | Bijlenga | |
| 6,597,590 | B2 * | 7/2003 | Ikimi | H02M 1/34 363/56.05 |
| 6,842,354 | B1 | 1/2005 | Tallam et al. | |
| 7,215,559 | B2 * | 5/2007 | Nondahl | H02M 5/458 327/551 |
| 7,495,938 | B2 * | 2/2009 | Wu | H02M 7/487 363/172 |
| 7,760,527 | B2 * | 7/2010 | Baudesson | H02M 1/12 363/132 |
| 7,855,524 | B2 * | 12/2010 | Pummer | G05F 1/70 318/438 |
| 9,537,425 | B2 * | 1/2017 | Honea | H02M 7/5387 |
| 2006/0197491 | A1 * | 9/2006 | Nojima | H02M 7/487 318/801 |
| 2007/0212121 | A1 * | 9/2007 | Takahashi | G03G 15/0813 399/265 |
| 2011/0249479 | A1 * | 10/2011 | Capitaneanu | H02M 7/487 363/132 |
| 2011/0280048 | A1 * | 11/2011 | Fujiyoshi | H02M 1/34 363/21.04 |
| 2011/0280049 | A1 | 11/2011 | Mori et al. | |
| 2012/0218795 | A1 * | 8/2012 | Mihalache | H02M 7/487 363/97 |
| 2012/0281442 | A1 | 11/2012 | Revelant et al. | |
| 2012/0287690 | A1 * | 11/2012 | Paatero | H02M 7/487 363/134 |
| 2013/0088901 | A1 * | 4/2013 | Bleus | H02M 7/487 363/71 |
| 2013/0258737 | A1 * | 10/2013 | Schoenlinner | H02M 7/53871 363/132 |

FOREIGN PATENT DOCUMENTS

| | | |
|---|---|---|
| JP | H09103078 A | 4/1997 |
| JP | 2001016856 A1 | 1/2001 |
| JP | 2011182517 A | 9/2011 |
| WO | 2011/048457 A1 | 4/2011 |

OTHER PUBLICATIONS

Bhat et al., An Improved Performance Three-Phase Neutral-Point Clamped Rectifier with Simplified Control Scheme, IEEE ISIE 2006, Jul. 9-12, 2006, pp. 1019-1024.

* cited by examiner

AC/DC VOLTAGE TRANSFORMER AND METHOD OF OPERATION THEREFOR

CROSS REFERENCE TO RELATED APPLICATIONS

This application is the National Stage of PCT/AT2013/050029 filed on Feb. 5, 2013, which claims priority under 35 U.S.C. §119 of Austrian Application No. A 156/2012 filed on Feb. 6, 2012, the disclosure of which is incorporated by reference. The international application under PCT article 21(2) was not published in English.

BACKGROUND OF THE INVENTION

1. Field of the Invention

The invention relates to a method for actuating an AC/DC voltage converter, having a DC voltage output, between which at least one series circuit of at least two capacitors and at least one series circuit of n switching elements is arranged, where n≥4. A connecting point of the switching elements between n/2 switching elements is connected to a connection for an AC voltage input. In addition, a series circuit of at least two diodes is connected in an antiparallel arrangement at least to the series circuit of the two switching elements situated closest to said connecting point. Finally, a connecting point of the capacitors is connected to a connecting point of the diodes. In addition, a controller for implementing the method and an AC/DC voltage converter containing such a controller are specified.

AC/DC voltage converters are known in principle and are used whenever an AC voltage has to be converted into a DC voltage, for example when charging circuits for accumulators or for supplying the intermediate circuit of an inverter. An AC/DC voltage converter may therefore also be part of an AC/AC converter. AC/DC voltage converters are often also operated in both directions, in which case they can also operate as DC/AC voltage converters.

The disadvantage of the known AC/DC voltage converters and methods of controlling them is that the numerous demands placed on these devices, such as keeping the output voltage constant with a varying energy flow, controlling the total current of the phases connected to the AC voltage input, controlling any one phase between the input current and input voltage as well as maintaining a sinusoidal input current with as little ripple as possible, can be met to only an unsatisfactory degree.

SUMMARY OF THE INVENTION

Accordingly, the objective of the invention is to propose an improved method of actuating an AC/DC voltage converter, an improved controller for an AC/DC voltage converter and an improved AC/DC voltage converter. In particular, the intention is to keep the output voltage constant with a varying energy flow, control the total current of the phases connected to the AC voltage input, control any one phase between the input current and input voltage in an improved manner and achieve a sinusoidal input current with as little ripple as possible.

The objective is achieved by the invention by means of a method of the type outlined above, whereby
an output voltage at the DC voltage output and a potential at said connecting point of the capacitors or of the diodes are provided as controlled variables,
an input current at the AC voltage input is provided as a manipulated variable and
the switching elements are provided as an actuating element for a control loop.

Alternatively, the invention may also be construed as being that
an output voltage at the DC voltage output and a sum of the currents fed via the terminals of an AC voltage input are provided as controlled variables,
an input current at the AC voltage input is provided as a manipulated variable and
the switching elements are provided as an actuating element for a control loop.

The thinking behind this is that the potential of said connecting point is directly correlated with the sum on the input currents.

The objective of the invention is also achieved by means of a controller for an AC/DC voltage converter comprising a DC voltage output, between which at least one series circuit of at least two capacitors and at least one series circuit of n switching elements is arranged, where n≥4, and a connecting point of the switching elements between n/2 switching elements is connected to a connection for an AC voltage input, and a series circuit of at least two diodes is connected in an antiparallel arrangement at least to the series circuit of the two switching elements situated closest to said connecting point, and a connecting point of the capacitors is connected to a connecting point of the diodes
wherein
an input for the output voltage at the DC voltage output and a potential of said connecting point of the capacitors or diodes are provided,
outputs for actuating the switching elements are provided as well as
means for running a control algorithm, whereby the output voltage and said potential are provided as controlled variables, an input current at the AC voltage input is provided as a manipulated variable and the switching elements are provided as an actuating element for a control loop.

Finally, the objective of the invention is also achieved by means of an AC/DC voltage converter comprising a DC voltage output between which at least one series circuit of at least two capacitors and at least one series circuit of n switching elements is arranged, where n≥4, and a connecting point of the switching elements between n/2 switching elements is connected to a connection of an AC voltage input, and a series circuit comprising at least two diodes is connected in an antiparallel arrangement at least to the series circuit of the two switching elements lying closest to said connecting point, and a connecting point of the capacitors is connected to a connecting point of the diodes,
and to which
a controller proposed by the invention is connected,
the input of which for the output voltage at the DC voltage output is connected to precisely this DC voltage output,
the input of which for the potential of said connecting point of the capacitors or diodes is connected to precisely this connecting point and
the outputs of which for actuating the switching elements are connected to precisely these switching elements.

With the controller proposed by the invention and the AC/DC voltage converter proposed by the invention, a sum of the currents fed via the terminals of an AC voltage input may also be used as the controlled variable instead of the potential of said connecting point of the capacitors.

In the manner proposed by the invention, an output voltage can be kept constant with a varying energy flow or adjusted on the basis of a desired value on the one hand and on the other hand, the total current of the phases connected to the AC voltage input can be preset as required. In particular, the latter can be controlled to the value zero so that the AC/DC voltage converter proposed by the invention can also be connected to three-phase three-wire systems. Furthermore, a low-ripple sinusoidal input current is achieved.

In addition, due to the series circuit of switching elements, the voltage across the individual switching elements is reduced so that even with a relatively high output voltage of the AC/DC voltage converter, switching elements with a relatively low cut-off voltage can be used.

Advantageous embodiments and features of the invention may be found in the dependent claims and in the description and drawings.

It is of advantage if the shape of the input current is preset. For example, a sinusoidal shape with a specific frequency can be preset, for example 50 Hz or 60 Hz. In this manner, the AC/DC voltage converter proposed by the invention can also be very effectively used as a PFC. Naturally, however, it would also be possible to preset any other desired shape.

It is also of advantage if the output voltage at the DC voltage output is controlled with the aid of an amplitude of the input current of preset shape. This makes control easier because only the height of a preset shape, for example sinusoidal, is varied.

It is also of advantage if the potential of said connecting point of the capacitors or diodes is controlled with the aid of the amplitude of the input current of preset shape. In the same way as explained above, this makes control very easy, for example by boosting a half-wave of the input current in order to shift the potential in the desired direction. With this variant, no ripple or only negligible ripple is generated on the input current, which means that this variant of the AC/DC voltage converter proposed by the invention can very easily be used as a PFC.

It is also of particular advantage if the potential of said connecting point of the capacitors or diodes is controlled with the aid of a pulse which is superimposed on the input current of preset shape. This type of control is very rapid because immediately there is a shift in the potential, a corresponding pulse can be superimposed in order to shift the potential in the desired direction. The potential can therefore be corrected significantly faster than the duration of a half-wave as a rule.

It is also of advantage if a phase shift between an input current and an input voltage is preset. In this manner, the AC/DC voltage converter proposed by the invention can be used as a phase shifter so that inductive load in a current network, for example electrical machines in a factory, can be compensated. If capacitive loads have to be compensated, the phase angle should be selected so that the AC/DC voltage converter exhibits inductive behavior.

It is of advantage if at least two switching elements which lie on one side of the connecting point of the switching elements are actuated differently. This makes use of the fact that switching elements lying in series create a logic AND collation. The resultant switch signal is therefore the result of the AND collated individual signals.

In this connection, it is of advantage if at least one of the switching elements lying on one side of said connecting point is actuated by a clock signal having the same frequency as an input voltage at the AC voltage input. With this variant of the invention, the switch signals of the other switching elements lying in series are gated for a half-period. Actuation of the switching elements can therefore be made easier.

In this respect, it is of advantage if at least one of the switching elements lying on the other side of said connecting point is actuated by an inverse signal to said clock signal. In this manner, the branches of a half-bridge are actuated in mirror image.

It is of advantage if at least one of the switching elements which is not actuated by the clock signal or the inverse signal to it is actuated by a pulse width modulated signal. In this manner, one and the same signal can be used to actuate both branches of a half-bridge.

It is of advantage if the connecting point of the capacitors or diodes is connected to a neutral terminal of the AC voltage input. In this manner, any total current of the phases can be generated and directed across the neutral wire.

It is of advantage if the connecting point of the switching elements is connected to a phase connection of the AC voltage input. In this manner, the AC/DC voltage converter can be connected to an AC network or a three-phase network.

It is of particular advantage if the switching elements are provided in the form of MOSFETs and the diodes formed by their body diodes. As a result of this feature, there is no need to provide separate diodes, thereby simplifying the circuit design.

BRIEF DESCRIPTION OF THE DRAWINGS

To provide a clearer understanding, the invention will be described in more detail with reference to the appended drawings.

These are very schematically simplified diagrams illustrating the following.

DETAILED DESCRIPTION OF PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

Figure 1:
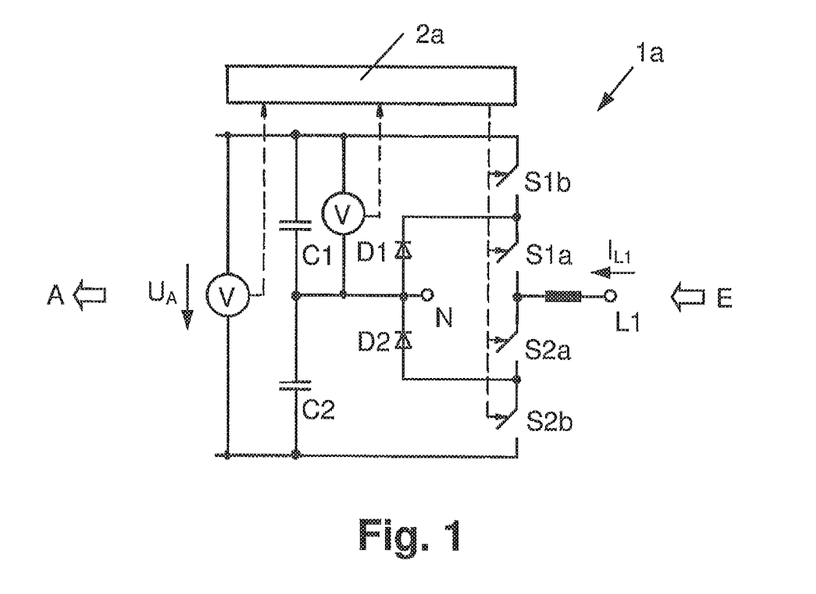
FIG. 1 a first schematically illustrated variant of an AC/DC voltage converter proposed by the invention.

FIG. 1 illustrates an AC/DC voltage converter 1a with a DC voltage output A, between which a series circuit of two capacitors C1, C2, and a series circuit of four switching elements S1a, S1b, S2a and S2b is arranged. The connecting point of the switching elements S1a, S2a is connected to a connection, specifically to a phase connection L1, of an AC voltage input E. A series circuit of two diodes D1, D2 is connected in an antiparallel arrangement to the series circuit of the two switching elements lying closest to said connecting point (in this instance S1a and S2a). Furthermore, a connecting point of the capacitors C1, C2 is connected to a connecting point of the diodes D1, D2. The connecting point of the capacitors C1, C2 or diodes D1, D2 is also connected a neutral terminal N of the AC voltage input E. Also provided at the AC voltage input E, although not illustrated is an inductance, which may be a part of the of the AC/DC voltage converter 1a or alternately is provided separately from it. The DC voltage output A may be connected to an intermediate circuit of an inverter, for example, in particular the intermediate circuit of a welding inverter.

As proposed by the invention, the arrangement has a controller 2a with inputs for the output voltage $U_A$ at the DC voltage output A and a potential of said connecting point of the capacitors C1, C2 or diodes D1, D2. The controller 2a further comprises outputs for actuating the switching elements S1a . . . S2b. Finally, the controller 2a comprises means for running a control algorithm, for which the output voltage $U_A$ and said potential are provided as controlled variables, an input current $I_{L1}$ at the AC voltage input E is provided as a manipulated variable and the switching elements S1a . . . S2b are provided as an actuating element of a control loop. For this purpose, a voltage measuring module V with measuring lines indicated by broken lines and control lines indicated by broken lines are provided for the switching elements S1a . . . S2b, as illustrated in FIG. 1.

Figure 2:
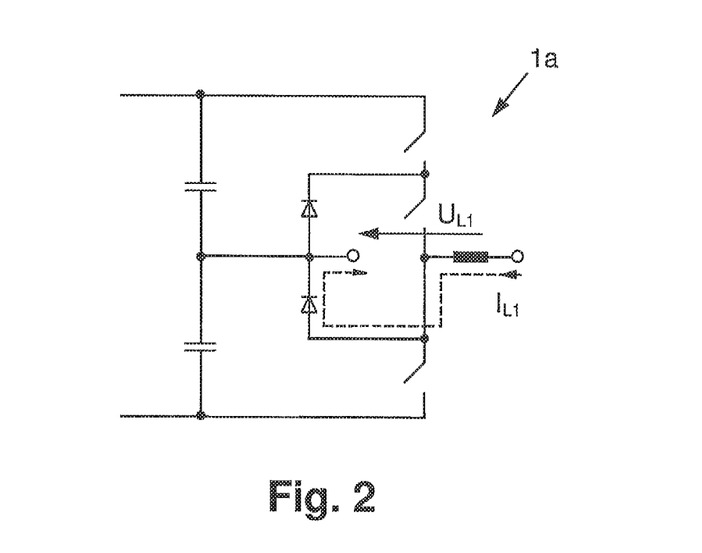
FIG. 2 the current flow through the AC/DC voltage converter illustrated in FIG. 1 during a first phase.

FIG. 2 illustrates the AC/DC voltage converter 1a from FIG. 1 but at a first instant at which the input voltage $U_{L1}$ is positive and switching elements S1a, S1b and S2b are open and switching element S2a is closed. The current $I_{L1}$ therefore flows across the path indicated by broken lines. During this first phase, the inductance is charged. (Note: to provide a clearer overall view, the controller 2a has been omitted from FIG. 2).

Figure 3:
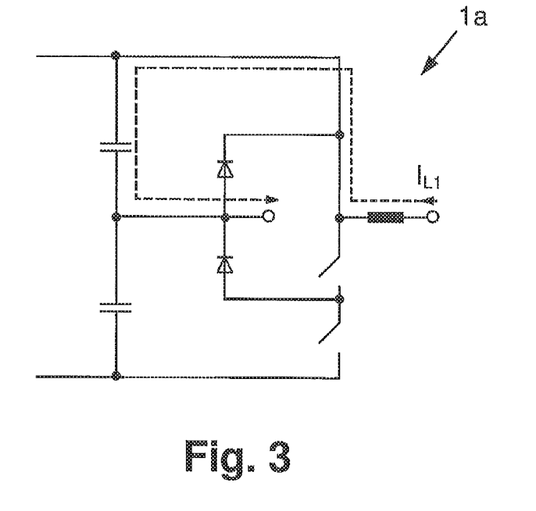
FIG. 3 the current flow through the AC/DC voltage converter illustrated in FIG. 1 during a second phase.

FIG. 3 illustrates the AC/DC voltage converter 1a from FIG. 1, this time at a second instant at which the input voltage $U_{L1}$ is again positive but switching elements S1a and S1b are closed and switching elements S2a and S2b are open. During this second phase, the current $I_{L1}$ flows across the path indicated by broken lines and charges the capacitor C1.

The phases for charging the capacitor C2 whilst the input voltage $U_{L1}$ is negative operate in the same way and are therefore not illustrated.

In the topology illustrated, free-wheeling diodes (not illustrated) are connected in parallel with the switching elements S1a . . . S2b, through which the current $I_{L1}$ is able to flow during the second phase, including when switching elements S1a . . . S2b are open, as will be explained in more detail below.

Figure 4:
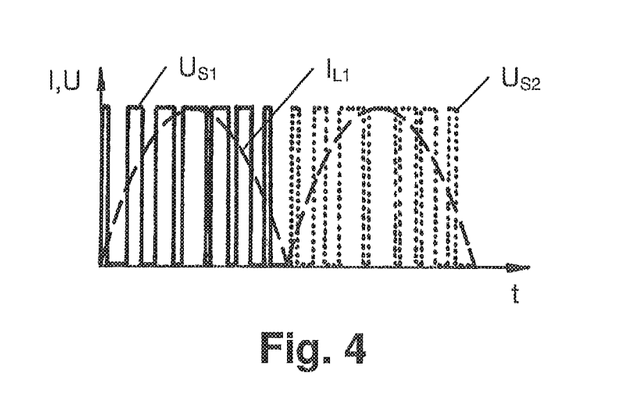
FIG. 4 an example of how the shape of an input current is preset.

FIG. 4 gives a voltage/timing diagram U over t and a current/timing diagram I over t illustrating how an input current $I_{L1}$ can be preset. To this end, switching elements S1a and S1b are actuated by the voltage signal $U_{S1}$ (the switching elements S1a . . . S2b may be field-effect transistors, for example, as will be explained later). It is also assumed for this example that switching element S2a is active during the pauses of switching elements S1a, S1b and vice versa. Switch S2b remains open. This results in the alternating states illustrated in FIGS. 2 and 3. In the case of a negative input voltage $U_{L1}$, the conditions are reversed accordingly (see dotted line). The voltage signals $U_{S1}$ and $U_{S2}$ are pulse width modulated sinusoidal signals so that at a relatively high switching frequency and due to the low pass effect of the inductance at connection L1 for the input current $I_{L1}$ indicated by broken lines, a sinusoidal input current $I_{L1}$ is obtained. (Note: in FIG. 4 and FIGS. 5 to 8, the second half-wave of the input current $I_{L1}$ is shown at the top in each case. In reality, however, the input current $L_{L1}$ changes its sign in the second half-wave). By actuating the switching elements S1a . . . S2b accordingly, therefore, any shape of shape input current $I_{L1}$ can be generated. By preference, a sinusoidal alternating current with 50 Hz (Europe) or 60 Hz (USA) is generated.

Figure 5:
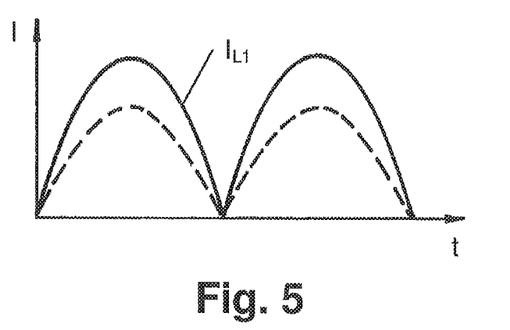
FIG. 5 an example of how the amplitude an input current based on a preset shape is varied in order to control the output voltage.

FIG. 5 then illustrates how the output voltage $U_A$ at the DC voltage output A is controlled with the aid of the amplitude of the input current $I_{L1}$ of preset shape. The solid line indicates a state of increased energy requirement at the DC voltage output A and the broken line indicates a state of lower energy requirement, and it should be pointed out that the negative current half-waves are shown having been already rectified accordingly for the DC side and correspond to a standard sinusoidal shape on the network side. The same also applies to the subsequent diagrams. The output voltage $U_A$ is preferably kept constant. Depending on the application, however, it would naturally also be possible to preset a variable output voltage $U_A$, which is then controlled accordingly.

Figure 6:
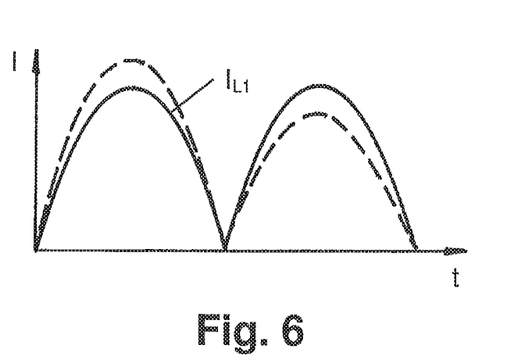
FIG. 6 an example of how the amplitude of an input current based on a preset shape is varied in order to control the potential of the connecting point of the capacitors at the output of the AC/DC voltage converter.

FIG. 6 then illustrates how the potential of said connecting point of the capacitors C1, C2 or diodes D1, D2 is controlled with the aid of the amplitude of the input current $I_{L1}$ of preset shape. The solid line indicates a state in which the desired potential has been achieved and therefore does not have to be actively adjusted. The two half-waves are therefore of identical size. The broken line, on the other hand, indicates a state in which said potential is slightly too high. The positive half-wave therefore becomes slightly larger and the negative half-wave smaller. As may easily be seen from FIGS. 2 and 3, this then means that capacitor C1 is being charged slightly more than capacitor C2. The potential of said connecting point is therefore shifted downwards. For the method proposed by the invention, it is not necessary to influence both half-waves. It would naturally also be conceivable to raise only the first half-wave or lower only the second half-wave.

Figure 7:
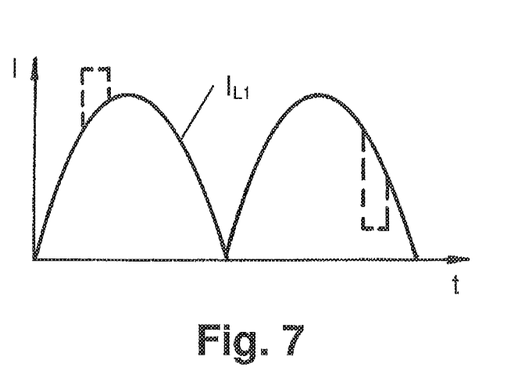
FIG. 7 an example of how an input current based on a preset shape has a pulse superimposed on it in order to control said potential.

FIG. 7 illustrates an alternative method whereby the potential of said connecting point of the capacitors C1, C2 or diodes D1, D2 is controlled with the aid of a pulse which is superimposed on the input current $I_{L1}$ of preset shape. The solid line again indicates the state in which the desired potential has been reached and therefore does not have to be actively adjusted. The two half-waves are therefore of identical size. The broken line, on the other hand, indicates a state in which said potential is slightly too high. The energy directed to capacitor C1 during the positive half-wave therefore becomes slightly greater with a positive pulse and the energy directed to capacitor C2 during the negative half-wave therefore becomes slightly less with a negative pulse. Again, it would naturally also be conceivable to superimpose a pulse during the first half-wave only or during the second half-wave only.

As proposed by the invention, therefore, both the output voltage $U_A$ at the DC voltage output A and the potential of the connecting point of the capacitors C1, C2 or diodes D1, D2 can be controlled simply by selectively actuating the switching elements S1a . . . S2b.

Figure 8:
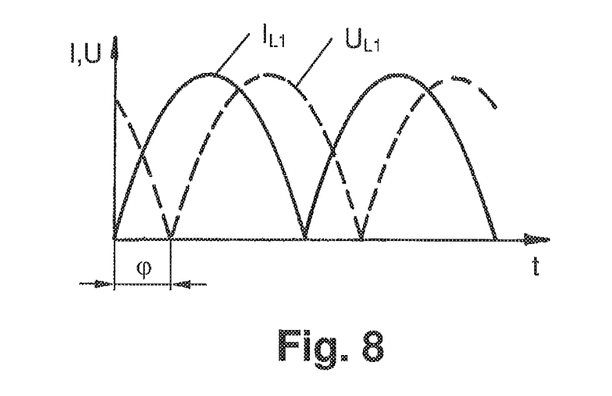
FIG. 8 an example of how a phase shift between input current and input voltage can be preset.
Figure 9:
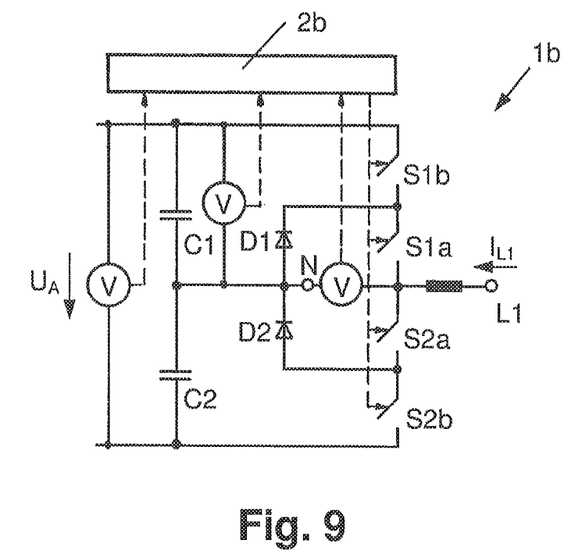
FIG. 9 the AC/DC voltage converter illustrated in FIG. 1 with an additional device for measuring the input voltage.

FIG. 8 then illustrates how a phase shift $\phi$ can be preset between an input current $I_{L1}$ and an input voltage $U_{L1}$. To this end, the input voltage $U_{L1}$ is simply determined and the setting for the input current $I_{L1}$ phase shifted by the desired phase angle $\phi$. FIG. 9 illustrates an AC/DC voltage converter 1b and a controller 2b which can also detect the input voltage $U_{L1}$ for this purpose.

Figure 10:
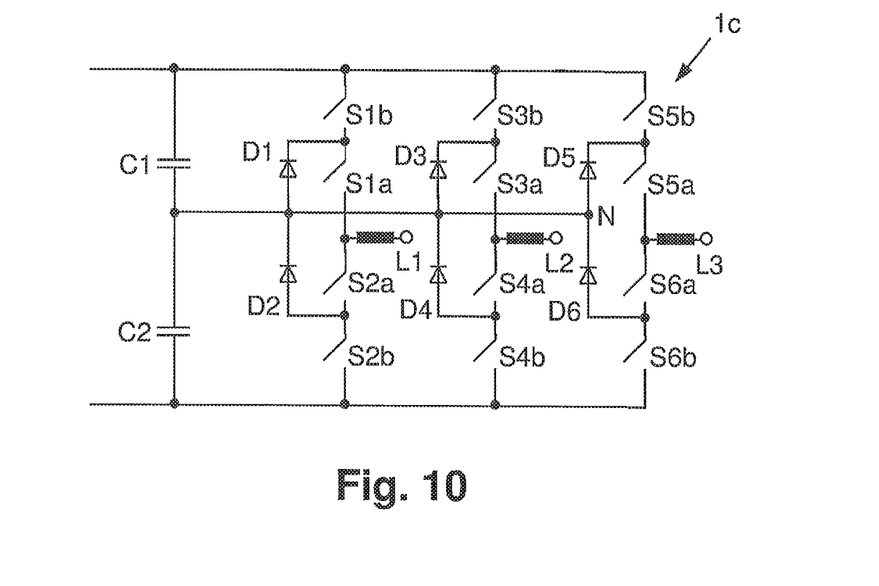
FIG. 10 a variant of the AC/DC voltage converter proposed by the invention for connecting to a three-phase network.

FIG. 10 also illustrates an AC/DC voltage converter 1c which, by contrast with the voltage converter 1a illustrated in FIG. 1, has not only one phase connection L1, but three phase connections L1, L2 and L3. Consequently, the AC/DC voltage converter 1c can be connected to a three-phase network with or without a neutral wire N. The AC/DC voltage converter 1c has additional switching elements S3a . . . S6b for the three-phase connection as well as additional diodes D3 . . . D6. The AC/DC voltage converter 1c is controlled in the same way as described above and this will therefore not be explained again in detail.

Figure 11:
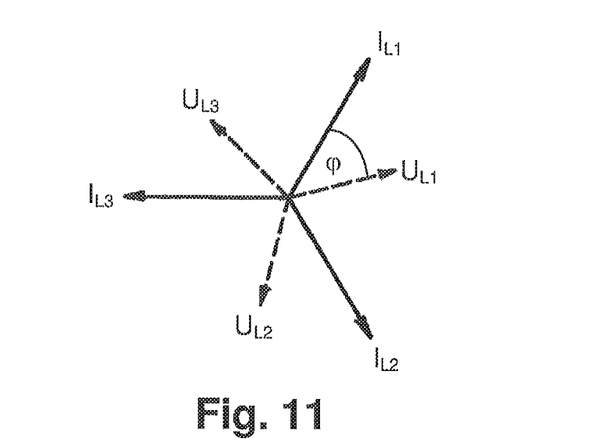
FIG. 11 an exemplary phasor diagram of the input currents and input voltages.

FIG. 11 illustrates an exemplary phasor diagram of the input currents $I_{L1}$, $I_{L2}$ and $I_{L3}$ and input voltages $U_{L1}$, $U_{L2}$ and $U_{L3}$. It is clearly evident on the one hand that the sum of the input currents $I_{L1}$, $I_{L2}$ and $I_{L3}$ is zero and therefore no current is flowing across a neutral wire N or the latter does not have to be connected. Amongst other things, the invention may therefore be used to control the input currents $I_{L1}$, $I_{L2}$ and $I_{L3}$ so that their sum is zero and the AC/DC voltage converter 1c proposed by the invention can also be operated in a network without a neutral wire N without any restrictions. The invention therefore achieves a so-called "zero-vector controller" (relative to the neutral wire N). Naturally, however, any other current or any other current shape can be generated in the neutral wire N—provided it is connected.

FIG. 11 also clearly shows the phase shift $\phi$ between the input currents $I_{L1}$, $I_{L2}$ and $I_{L3}$ and input voltages $U_{L1}$, $U_{L2}$ and $U_{L3}$. Amongst other things, the invention may therefore also be used as a phase shifter. In the example illustrated, the input currents $I_{L1}$, $I_{L2}$ and $I_{L3}$ lead the input voltages $U_{L1}$, $U_{L2}$ and $U_{L3}$ and the AC/DC voltage converter 1d therefore exhibits capacitive behavior. In this manner, an inductive load in a current network, for example electrical machines in a factory, can be compensated so that the current network overall exhibits ohmic behavior. If capacitive loads have to be compensated, the phase angle $\phi$ is selected accordingly so that it is negative, in which case the AC/DC voltage converter 1d exhibits inductive behavior.

Figure 12:
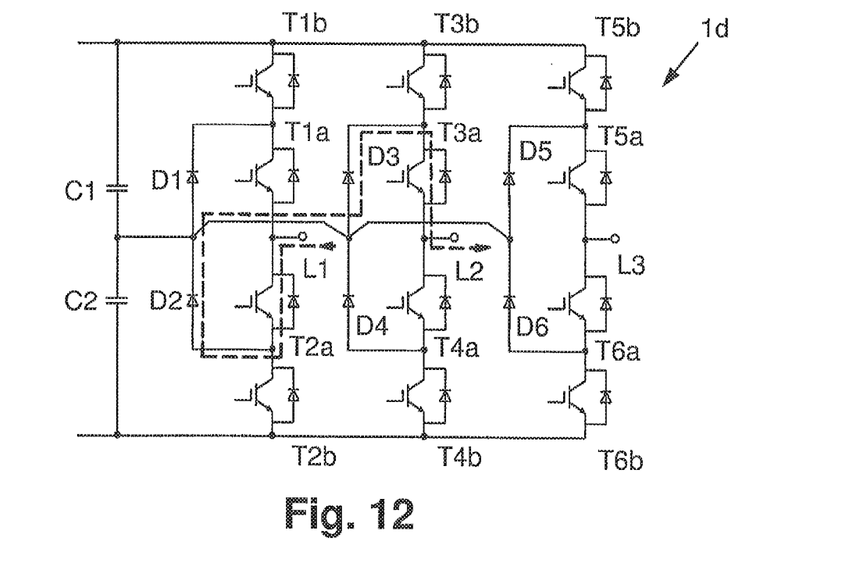
FIG. 12 a variant of the AC/DC voltage converter proposed by the invention with more than two switching elements per half-bridge during a first phase.

FIG. 12 illustrates an embodiment of an AC/DC voltage converter 1d which is very similar to the AC/DC voltage converter 1c from FIG. 11. The switching elements in this instance are provided in the form of transistors T1a . . . T6b, specifically IGBTs (Insulated Gate Bipolar Transistor). A series circuit of n (in this instance n=4) switching elements T1a . . . T2b respectively constitutes a half-bridge, and the connecting point connected to the connection L1 of the AC voltage input E is arranged between n/2 switching elements T1a . . . T2b. In this manner, the voltage across the individual transistors T1a . . . T6b is reduced so that even at a relatively high output voltage $U_A$, transistors with a relatively low maximum cut-off voltage can be used. In this example a diode is connected antiparallel with every transistor T1a . . . T6b to permit the current flow in one direction even if the transistor T1a . . . T6b is closed. If MOSFETs (Metal Oxide Semiconductor Field Effect Transistor) are used for the transistors T1a . . . T6b, discrete diodes connected antiparallel can be dispensed with because MOSFETs have body diodes anyway. Furthermore, IGBTs which have an integrated antiparallel diode are known.

FIG. 12 illustrates one possible current flow during a first phase indicated by a broken line at an instant at which the input currents $I_{L1}$, $I_{L2}$ and $I_{L3}$ are the same as illustrated in FIG. 11. In other words, the current is flowing across input L1 and across output L2. At this particular instant, no current is flowing across L3.

Figure 13:
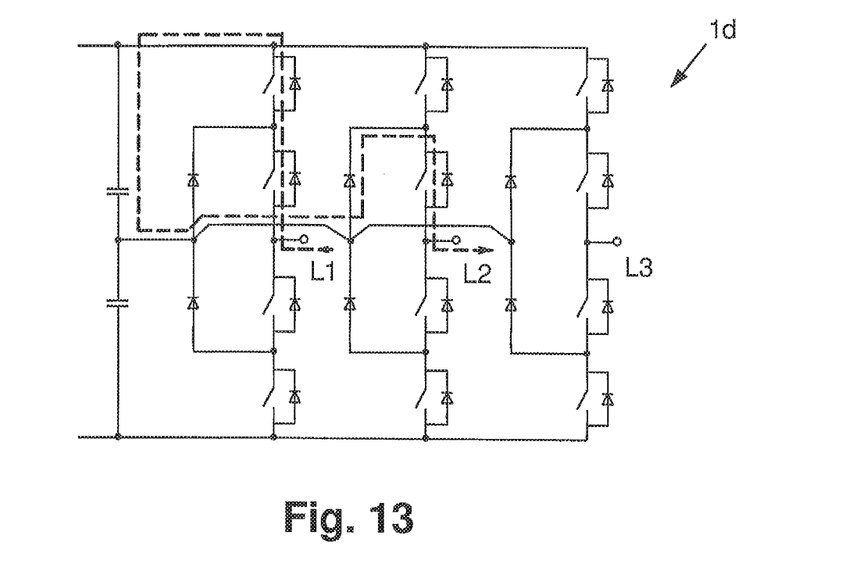
FIG. 13 the AC/DC voltage converter proposed by the invention illustrated in FIG. 12 during a second phase.

FIG. 13 illustrates one possible current flow during a second phase indicated by a broken line, again at an instant at which the input currents $I_{L1}$, $I_{L2}$ and $I_{L3}$ are the same as illustrated in FIG. 11. In other words, the current is flowing across input L1 and across output L2 but now across the capacitor C1.

Figure 14:
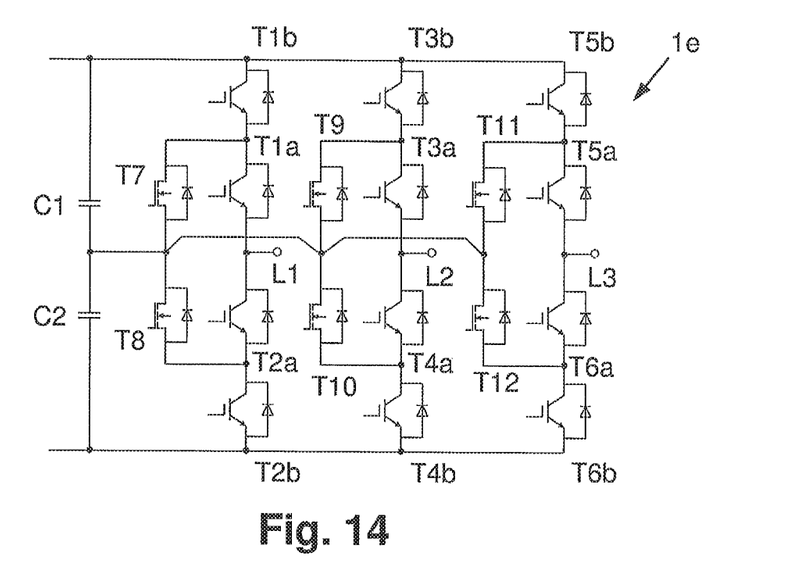
FIG. 14 a variant of the AC/DC voltage converter proposed by the invention where all the diodes are replaced by transistors.

FIG. 14 illustrates an embodiment of an AC/DC voltage converter 1e which is very similar to the AC/DC voltage converter 1d from FIGS. 12 and 13. However, in this instance, the diodes D1 . . . D6 are also replaced by IGBTs. The number of different components can therefore be reduced, thereby simplifying production of the circuit. If MOSFETs are used, the diodes D1 . . . D6 will advantageously be formed by the body diodes of the MOSFETs.

Figure 15:
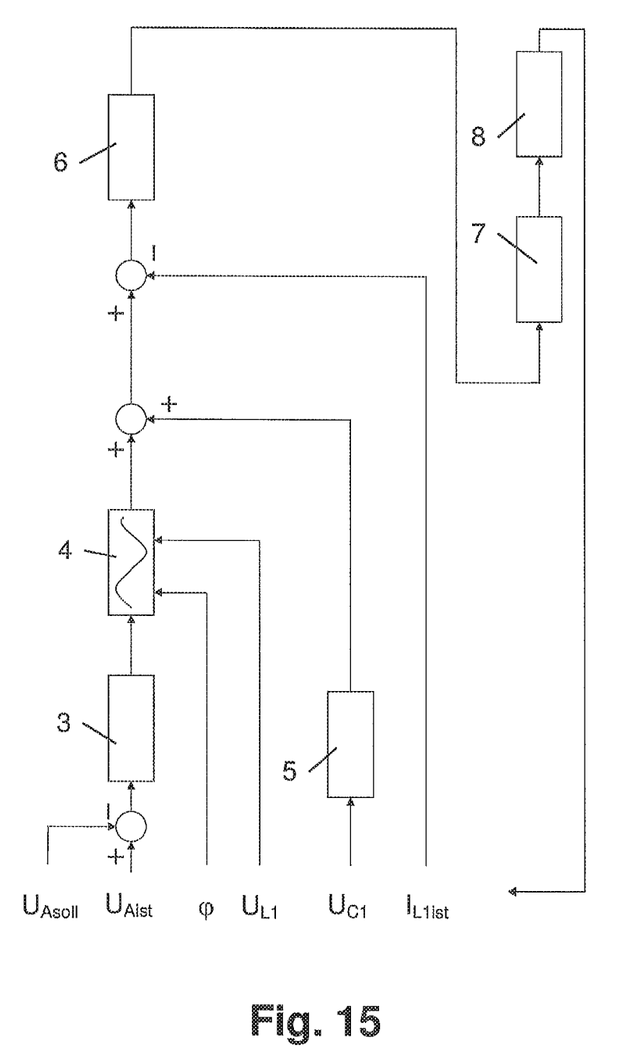
FIG. 15 a functional block diagram of a variant of the controller proposed by the invention.

FIG. 15 is a functional block diagram of an example of a controller proposed by the invention. The desired value of the output voltage $U_{Asoll}$ is subtracted from its actual value $U_{Aist}$ and forwarded to a power controller 3. Its output value, a current amplitude, is forwarded together with the phase angle $\phi$ and input voltage $U_{L1}$ to a synchronizer and desired value converter 4. Its output signal is added to the output signal of a zero current controller 5 which has the potential (in this instance represented by the voltage $U_{C1}$ at the capacitor C1) at the connecting point of the capacitors C1, C2 as its input. This sum signal represents the desired current, from which the actual value of the input current $I_{L1ist}$ is subtracted. This signal is then forwarded to a current controller 6 and its output signal to a pulse pattern generator 7. As described above, this pulse pattern acts via the switching elements S1a . . . S6b, T1a . . . T6b on the real control path 8 on which the required actual values can in turn be determined.

Figure 16:
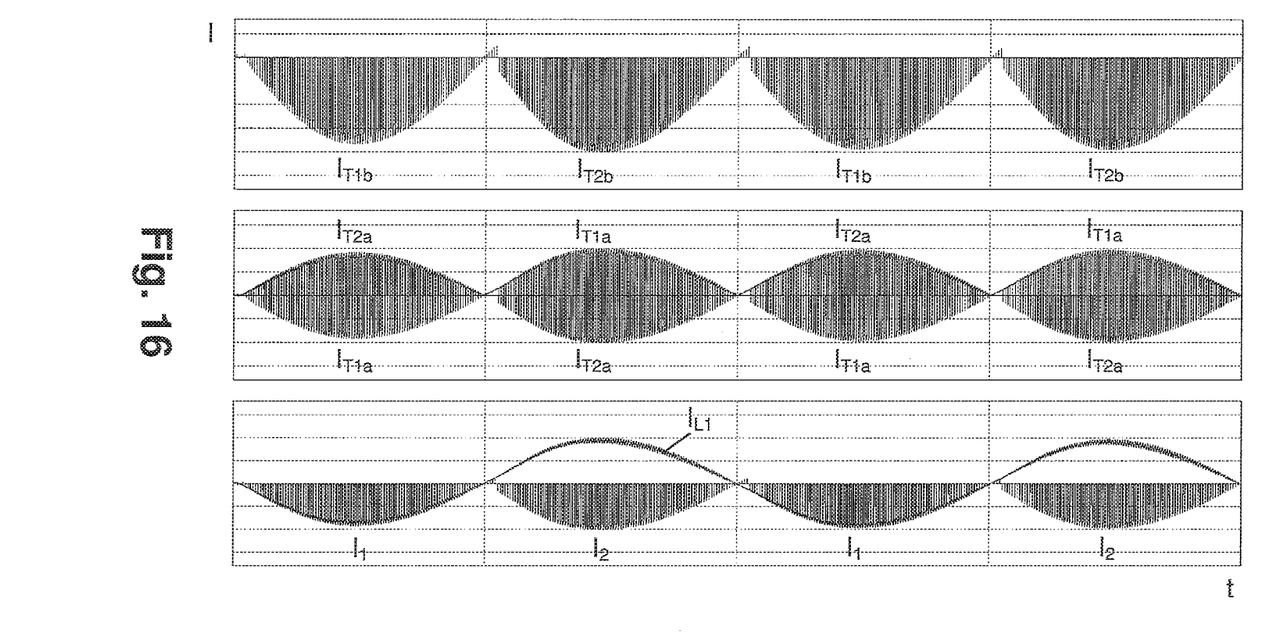
FIG. 16 the time plot of selected currents on an AC/DC voltage converter proposed by the invention.

FIG. 16 illustrates the time plot of selected current curves of a real or simulated AC/DC voltage converter 1e. The currents $I_{T1a}$, $I_{T1b}$, $I_{T2a}$ and $I_{T2b}$ through transistors T1a, T1b, T2a and T2b may be seen. Also illustrated are the input current $I_{L1}$ and current $I_1$ in the top and current $I_2$ in the bottom connecting branch between the series circuit of diodes D1, D2 and the series circuit of transistors T1a, T1b, T2a and T2b. It should be noted that the measure for current I in the uppermost diagram is twice as high as that of the two bottom diagrams. In the lowermost diagram, it may be seen that the input current $I_{L1}$ is practically sinusoidal and has only a small current ripple. The AC/DC voltage converter 1a . . . 1e proposed by the invention may also be very effectively used as a PFC (Power Factor Correction).

Figure 17:
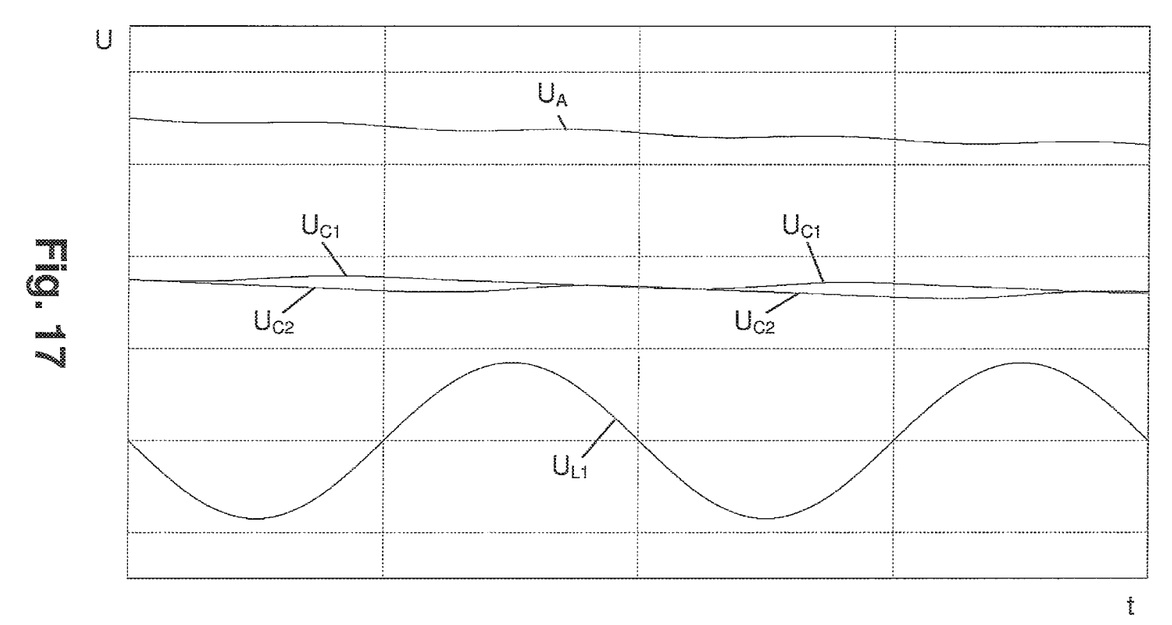
FIG. 17 the time plot of selected voltages on an AC/DC voltage converter proposed by the invention.

FIG. 17 additionally shows the voltages $U_{C1}$ and $U_{C2}$ in the capacitors C1 and C2, their total voltage, which is equal to the output voltage $U_A$, and the input voltage $U_{L1}$. In this diagram, it may clearly be seen that the output voltage $U_A$ has only a very small residual ripple.

Figure 18:
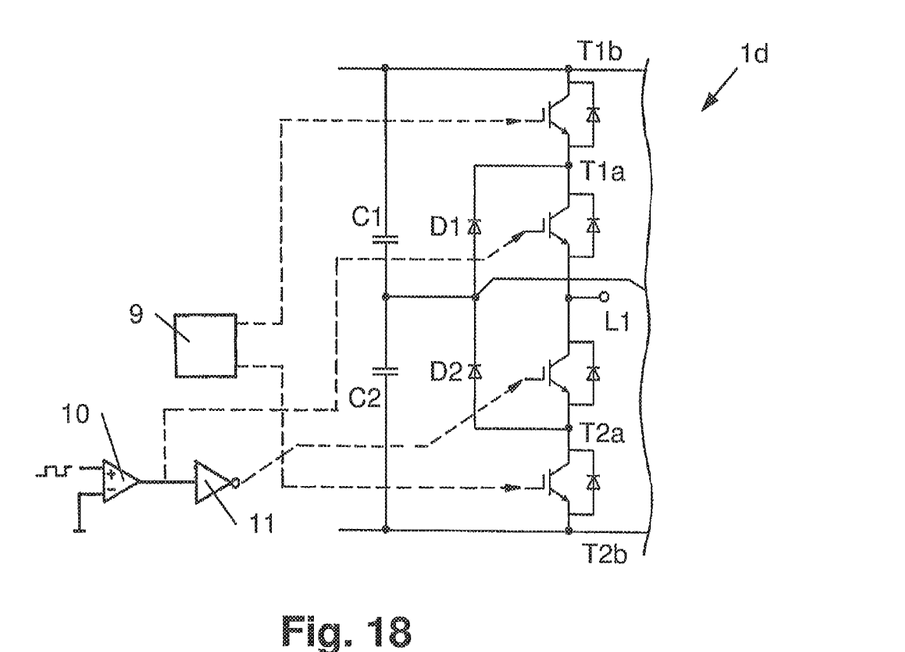
FIG. 18 an advantageous circuit variant for actuating a half-bridge with more than two switching elements.

FIG. 18 illustrates a detail of the AC/DC voltage converter 1d from FIGS. 12 and 13 with a special actuation of the transistors T1a . . . T6b based on the example of the half-bridge comprising transistors T1a . . . T2b. In this instance, the outer transistors T1b and T2b are actuated by a DSP 9 (Digital Signal Processor), for example with a pulse width modulated pulse pattern. Transistor T1a, on the other hand, is actuated by a clock signal corresponding to the network frequency of the input current $I_{L1}$, in this instance via the operational amplifier 10. Transistor T2a is actuated in mirror image with the aid of the inverter 11. Due to the logic AND collation of transistors T1a and T1b respectively T2a and T2b connected one after the other, the pulse pattern of the DSP 9 does not become active unless the relevant transistor T1a respectively T2a lying in series is also conducting.

Figure 19:
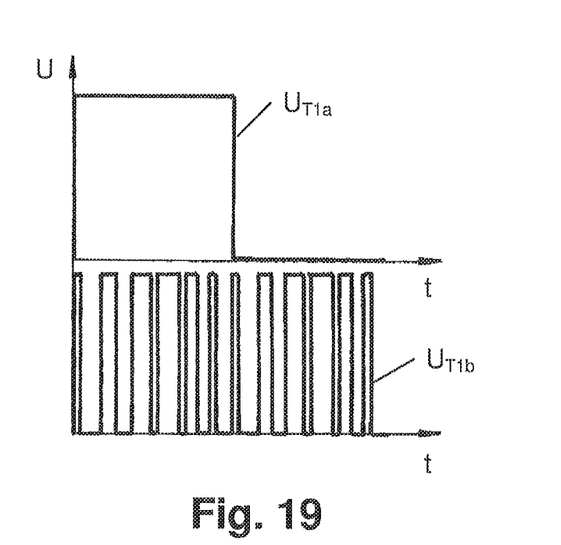
FIG. 19 the time plot of the switch signals for the transistors corresponding to the circuit variant illustrated in FIG. 18.

FIG. 19 shows an exemplary plot of the control signals $U_{T1a}$ and $U_{T1b}$ for transistors T1a and T1b. From this, it may clearly be seen that transistors T1b and T2b can be actuated by the same pulse pattern $U_{T1b}$ of the DSP 9 because the control voltage $U_{T1a}$ for transistor T1a and the inverse control voltage for transistor T2a cause the pulse pattern $U_{T1b}$ to be active for only a half-wave of the input voltage $U_{L1}$.

In the example illustrated, it would naturally also be possible for inner transistors T1a and T2a to be actuated by the DSP 9 and the outer transistor T1b to be actuated by the operational amplifier 10 and outer transistor T2b to be actuated by the inverter 11. It would naturally also be conceivable for the DSP 9 to output a pulse pattern for a half-wave and a logic zero for the next half-wave at an output so that transistors T1a and T1b can be actuated by the same signal. In this case, transistors T2a and T2b can be actuated by an equivalent signal at a second output of the DSP 9.

The embodiments illustrated as examples represent possible variants of a controller proposed by the invention and an AC/DC voltage converter 1a . . . 1e proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the controller and AC/DC voltage converter 1a . . . 1e, they and their constituent parts are illustrated to a certain extent out of scale and/or on an enlarged scale and/or on a reduced scale.

The objective underlying the independent inventive solutions may be found in the description.

LIST OF REFERENCE NUMBERS

1a . . . 1e AC/DC voltage converter
2a . . . 2b Controller
3 Power controller
4 Synchronizer and desired value converter
5 Zero current controller
6 Current controller
7 Pulse pattern generator
8 Control path
9 Digital signal processor (DSP)
10 Operational amplifier
11 Inverter
A Output
C1, C2 Capacitor
D1 . . . D6 Diode
E Input
I Current
$I_1$, $I_2$ Currents in the connecting branch
$I_{L1}$ . . . $I_{L3}$ Input current, phase current
$I_{L1ist}$ Actual value of the input current
$I_{T1a}$ . . . $I_{T2b}$ Transistor currents
L1 . . . L3 Phase connection
N Neutral terminal
S1a . . . S6b Switching element
t Time
T1a . . . T6b Transistor
T7 . . . T12 Transistor
U Voltage
$U_A$ Output voltage
$U_{Aist}$ Actual value of the output voltage
$U_{Asoll}$ Desired value of the output voltage
$U_{C1}$, $U_{C2}$ Capacitor voltage
$U_{L1}$ . . . $U_{L3}$ Input voltage, phase voltage
$U_{S1}$, $U_{S2}$ Control voltage for switching element
V Voltage measuring device (voltmeter)
φ Phase angle, phase shift

The invention claimed is:

1. A method of actuating an AC/DC voltage converter having a DC voltage output between which at least one series circuit of at least two capacitors and at least one series circuit of n switching elements is arranged, where n≥4, and a connecting point of the switching elements between n/2 switching elements is connected to a connection of an AC voltage input, a series circuit of at least two diodes is connected in an antiparallel arrangement to at least the series circuit of the two switching elements lying closest to said connecting point, and a connecting point of the capacitors is connected to a connecting point of the diodes, wherein an output voltage at the DC voltage output and a potential of said connecting point of the capacitors or diodes are provided as controlled variables, an input current at the AC voltage input is provided as a manipulated variable, the switching elements are provided as an actuating element of a control loop and at least two switching elements are connected to each other serially, lie on one side of said connecting point of the switching elements, form an AND gate, and are actuated differently so that the resultant switch signal is the result of the AND collated individual signals, wherein at least one of the switching elements lying on one side of said connecting point is actuated by a clock signal having the same frequency as an input voltage of the AC voltage input, wherein at least one of the switching elements lying on the other side of said connecting point is actuated by an inverse signal to said clock signal, and wherein on both sides of the connection point at least one of the switching elements which is not actuated by the clock signal or the inverse signal thereto is actuated by a pulse width modulated signal.

2. The method according to claim 1, wherein the shape of the input current is preset.

3. The method according to claim 2, wherein the output voltage at the DC voltage output is controlled with the aid of an amplitude of the input current.

4. The method according to claim 3, wherein the potential of said connecting point of the capacitors or diodes is controlled with the aid of the amplitude of the input current.

5. The method according to claim 3, wherein the potential of said connecting point of the capacitors or diodes is controlled with the aid of a pulse which is superimposed on the input current and selectively actuates the switching elements.

6. The method according to claim 1, wherein a phase shift between an input current and an input voltage is preset.

7. A controller for an AC/DC voltage converter having a DC voltage output between which at least one series circuit of at least two capacitors and at least one series circuit of n switching elements is arranged, where n≥4, and a connecting point of the switching elements between n/2 switching elements is connected to a connection of an AC voltage input, and a series circuit of at least two diodes is connected in an antiparallel arrangement to at least the series circuit of the two switching elements lying closest to said connecting point, and a connecting point of the capacitors is connected to a connecting point of the diodes, comprising an input for the output voltage at the DC voltage output and a potential of said connecting point of the capacitors or diodes, outputs for actuating the switching elements and a control device configured to run a control algorithm, whereby the output voltage and said potential are provided as controlled variables, an input current at the AC voltage input is provided as a manipulated variable and the switching elements are provided as an actuating element of a control loop and wherein at least two switching elements are connected to each other serially, lie on one side of said connecting point of the switching elements, form an AND gate, and are actuated differently so that the resultant switch signal is the result of the AND collated individual signals, wherein at least one of the switching elements lying on one side of said connecting point is actuated by a clock signal having the same frequency as an input voltage of the AC voltage input, wherein at least one of the switching elements lying on the other side of said connecting point is actuated by an inverse signal to said clock signal, and wherein on both sides of the connection point at least one of the switching elements which is not actuated by the clock signal or the inverse signal thereto is actuated by a pulse width modulated signal.

8. An AC/DC voltage converter having a DC voltage output between which at least one series circuit of at least two capacitors and at least one series circuit of n switching elements is arranged, where n≥4, and a connecting point of the switching elements between n/2 switching elements is connected to a connection of an AC voltage input, and a series circuit of at least two diodes is connected in an antiparallel arrangement to at least the series circuit of the two switching elements lying closest to said connecting point, and a connecting point of the capacitors is connected to a connecting point of the diodes, comprising the controller according to claim 7, the input of which for output voltage at the DC voltage output is connected to precisely this DC voltage output, the input of which for the potential of said connecting point of the capacitors or diodes is connected precisely to this connecting point and outputs of which for actuating the switching elements are connected to precisely these switching elements.

9. The AC/DC voltage converter according to claim 8, wherein the connecting point of the capacitors or diodes is connected to a neutral terminal of the AC voltage input.

10. The AC/DC voltage converter according to claim 8, wherein the connecting point of the switching elements is connected to a phase connection of the AC voltage input.

11. The AC/DC voltage converter according to claim 8, wherein the switching elements are provided in the form of MOSFETs having body diodes and wherein the at least two diodes are the body diodes.

* * * * *